United States Patent
Fox et al.

(10) Patent No.: US 10,737,764 B2
(45) Date of Patent: Aug. 11, 2020

(54) BASE FLIGHT CONTROL MEMBER ORIENTATION MECHANISM AND CONTROL

(71) Applicant: The Boeing Company, Chicago, IL (US)

(72) Inventors: Michael Thomas Fox, Saint Charles, MO (US); Eric Anton Howell, Ballwin, MO (US); Jeffrey M. Roach, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 320 days.

(21) Appl. No.: 15/952,327

(22) Filed: Apr. 13, 2018

(65) Prior Publication Data

US 2019/0315450 A1   Oct. 17, 2019

(51) Int. Cl.
| | |
|---|---|
| *B64C 9/02* | (2006.01) |
| *F42B 10/00* | (2006.01) |
| *B64C 5/10* | (2006.01) |
| *B64C 9/00* | (2006.01) |

(52) U.S. Cl.
CPC ............... *B64C 9/02* (2013.01); *B64C 5/10* (2013.01); *B64C 2009/005* (2013.01); *F42B 10/00* (2013.01)

(58) Field of Classification Search
CPC ....... B64C 9/02; B64C 2009/005; B64C 5/10; B64C 13/38; F42B 10/00; F42B 10/62
See application file for complete search history.

(56) References Cited

U.S. PATENT DOCUMENTS

| | | | |
|---|---|---|---|
| 2,660,028 | A | 11/1953 | Geyer |
| 2,679,827 | A | 6/1954 | Perdue |
| 3,253,613 | A | 5/1966 | Richolt |
| 3,585,902 | A | 6/1971 | Anderson |
| 4,932,311 | A | 6/1990 | Mibu et al. |
| 5,074,495 | A | 12/1991 | Raymond |
| 5,144,851 | A * | 9/1992 | Grimm ............... B64C 13/36 74/89.26 |

(Continued)

FOREIGN PATENT DOCUMENTS

| | | |
|---|---|---|
| DE | 102007029358 A1 | 1/2009 |
| EP | 1500825 A2 | 1/2005 |

(Continued)

OTHER PUBLICATIONS

European Search Report dated Sep. 6, 2019 in re EP application No. 19169010.6 filed Apr. 12, 2019.

(Continued)

*Primary Examiner* — Valentina Xavier
(74) *Attorney, Agent, or Firm* — Coats & Bennett, PLLC

(57) ABSTRACT

Methods and devices for adjusting a position of a flight control member relative to a base of an aircraft. The devices and methods include a joint that movably connects the flight control surface to the base. An extension member is connected to the flight control surface and extends through the joint. Adjustable linear members of the base are connected to the extension member and configured to adjust the position of the extension member. This adjustment results in re-orienting the flight control member relative to the base to adjust the flight of the aircraft.

20 Claims, 19 Drawing Sheets

(56) References Cited

U.S. PATENT DOCUMENTS

| | | |
|---|---|---|
| 5,937,646 A | 8/1999 | Zakula |
| 6,352,018 B1 | 3/2002 | Krisher |
| 6,578,425 B2 | 6/2003 | Hickman |
| 7,059,563 B2 * | 6/2006 | Huynh ............... B64C 9/16 244/226 |
| 8,109,163 B2 | 2/2012 | Hudson et al. |
| 8,359,851 B2 | 1/2013 | Haase |
| 8,418,956 B2 | 4/2013 | Fukui |
| 8,499,552 B2 | 8/2013 | Kauss et al. |
| 9,334,914 B2 | 5/2016 | Gartner |
| 9,618,102 B2 | 4/2017 | Hirai |
| 9,709,052 B1 | 7/2017 | Tanju et al. |
| 9,823,670 B2 | 11/2017 | Wilson et al. |
| 9,969,233 B2 | 5/2018 | Leglize |
| 9,994,304 B2 | 6/2018 | Ito |
| 10,384,764 B2 | 8/2019 | Blanc et al. |
| 2007/0194738 A1 | 8/2007 | Hirai |
| 2015/0059325 A1 | 3/2015 | Knussman et al. |
| 2015/0114151 A1 | 4/2015 | Hirai |
| 2016/0091004 A1 | 3/2016 | Gomm et al. |
| 2016/0096617 A1 | 4/2016 | Ito |
| 2017/0233064 A1 | 8/2017 | McCormick et al. |
| 2017/0335916 A1 | 11/2017 | Fox |
| 2018/0128359 A1 | 5/2018 | Fida |
| 2018/0135717 A1 | 5/2018 | Fox et al. |
| 2018/0156293 A1 | 6/2018 | Fox et al. |

FOREIGN PATENT DOCUMENTS

| | | |
|---|---|---|
| EP | 1710446 A2 | 10/2006 |
| EP | 3067252 A1 | 9/2016 |

OTHER PUBLICATIONS

European Search Report dated Sep. 3, 2019 in re EP application No. 19167685.7 filed Apr. 5, 2019.

Freescale Semiconductor, Inc., "M68HC08 Microcontrollers, High Data Rate Wireless USB Optical Mouse Solution Using the MC68HC908QY4 and MC68HC908JB12," Designer Reference Manual, DRM055/D, Jan. 1, 2004, Motorola, pp. 1-44.

Avago Technologies, "Optical Mouse Sensors," AV00-0115EN, May 14, 2007, pp. 1-24.

* cited by examiner

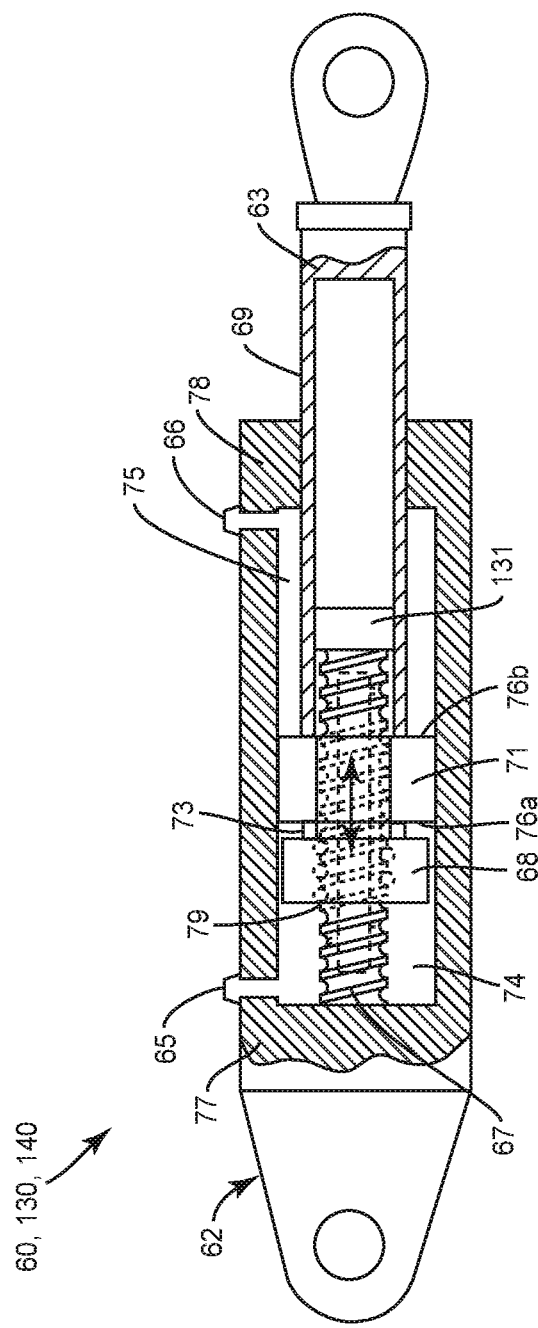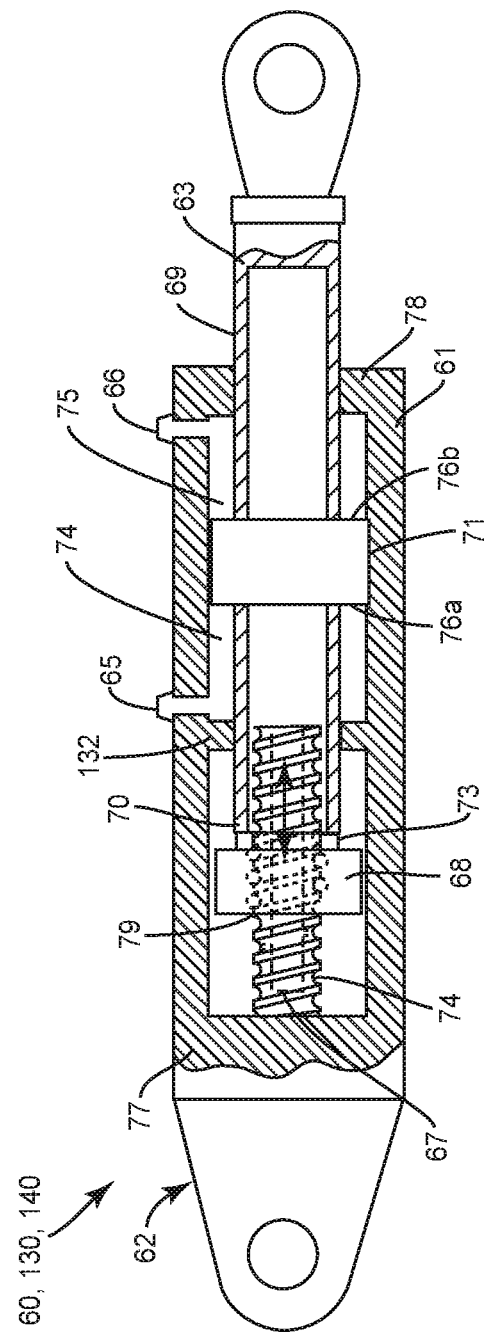

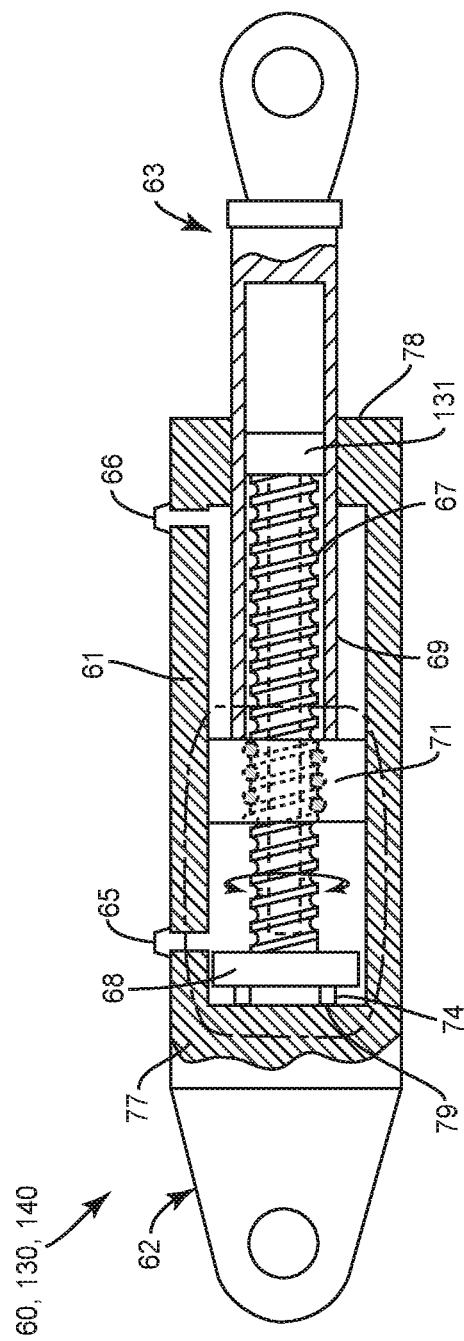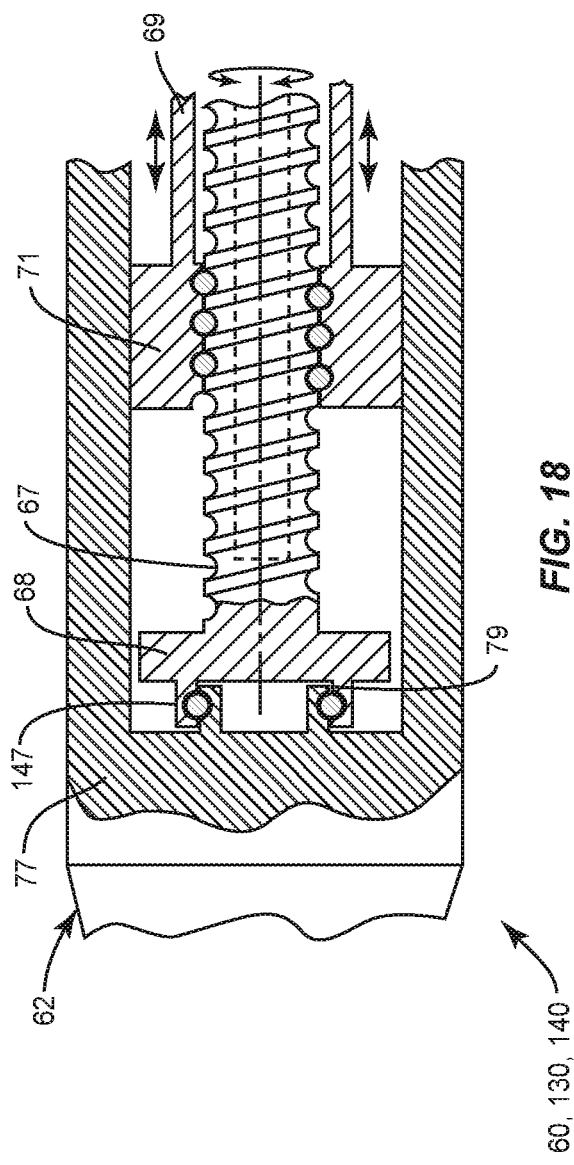

BASE FLIGHT CONTROL MEMBER ORIENTATION MECHANISM AND CONTROL

BACKGROUND

Aircraft include one or more movable flight control members such as ailerons on the wings for roll control, elevators on the horizontal tail of the empennage for pitch control, a rudder on the vertical tail of the empennage for yaw control, a nose cone of a missile, and other movable control surfaces. Movement of a flight control member is typically effected by one or more actuators mechanically coupled between a base (e.g., a wing spar, a platform of a missile) and the flight control surface (e.g., an aileron, nose cone). In many aircraft, the actuators for flight control members are linear hydraulic actuators driven by one or more hydraulic systems.

A challenge with aircraft is preventing the occurrence of flutter of the flight control members during flight. Control member flutter can be described as unstable aerodynamically-induced oscillations of the flight control member, and can occur in flight control systems where the operating bandwidth of the flight control system overlaps the resonant frequency of the flight control surface. Unless damped, the oscillations can rapidly increase in amplitude with the potential for undesirable results, including exceeding the strength capability of the mounting system of the flight control member and the actuator. Contributing to the potential for control member flutter is elasticity in the flight control system. For example, hydraulic actuators can exhibit a linear spring response under load due to compressibility of the hydraulic fluid. The compressibility of the hydraulic fluid can be characterized by the cross-sectional area of the actuator piston, the volume of the hydraulic fluid, and the effective bulk modulus of elasticity of the hydraulic fluid.

SUMMARY

One aspect is directed to an assembly configured to be positioned on an aircraft to position a flight control member relative to a base to steer the aircraft. The assembly includes an extension member configured to be attached to the flight control member with the extension member including an elongated shape with first and second ends and having a longitudinal axis. Linear members extend between and connect the second end of the extension member to the base. The linear members are configured to change an angular orientation of the flight control member relative to the base by moving the second end of the extension member relative to the base. The assembly also includes a joint that includes an inner race mounted to the extension member, an outer race mounted to the base, and bearings between the inner and outer races. The joint provides a spherical motion of the flight control member relative to the base achieving two orthogonal, rotational degrees of freedom and prevents rotation of the flight control member relative to the base about the longitudinal axis of the extension member.

In one aspect, at least one of the linear members is a dampened actuator.

In one aspect, the dampened actuator includes a first terminal and a second terminal that are movable relative to one another along an axis and configured to be mutually exclusively coupled to the base and the second end of the extension member, a rod coupled to and movable with the second terminal, a threaded shaft coupled to and movable with the first terminal, a flywheel with a flywheel annulus coupled to both the rod and the threaded extension member, and with the flywheel configured to rotate in proportion to axial rate of the rod relative to the threaded extension member in correspondence with actuation of the movable device by the actuator.

In one aspect, at least one of the linear members includes an inerter integrated within a hydraulic actuator with the hydraulic actuator including a piston attached to a movable rod and with the piston dividing a housing chamber into a first chamber and a second chamber each configured to hold hydraulic fluid, and the inerter including a flywheel rotatably attached to the piston and positioned within one of the first and second chambers.

In one aspect, the assembly includes a motor configured to rotate the flywheel.

In one aspect, the assembly includes brakes configured to engage with the flywheel to control rotation of the flywheel relative to the piston.

In one aspect, the flight control member is a nose cone and the base is a platform.

In one aspect, the joint is a Rzeppa joint.

One aspect is directed to an aircraft that includes a flight control member and a base. An extension member is affixed to the flight control member and includes an elongated shape with first and second ends and a longitudinal axis. Linear members movably mount the second end of the extension member to the base with the linear members configured to change an angular orientation of the flight control member relative to the base by moving the second end of the extension member relative to the base. The aircraft also includes a joint with an inner race mounted to the extension member, an outer race mounted to the base, and bearings. The joint provides a spherical motion of the flight control member relative to the base achieving two orthogonal, rotational degrees of freedom and prevents rotation of the flight control member relative to the base about the longitudinal axis of the extension member. Sensors are positioned at the joint to sense positions of the inner race relative to the outer race. A control circuit receives signals from the sensors and controls a relative position between the flight control member and the base.

In one aspect, at least one of the linear members includes an actuator and an integrated inerter. The inerter includes a first terminal and a second terminal that are movable relative to one another along an inerter axis and configured to be mutually exclusively coupled to the base and the extension member, a rod coupled to and movable with the second terminal, a threaded shaft coupled to and movable with the first terminal, and a flywheel having a flywheel annulus coupled to both the rod and the threaded shaft with the flywheel configured to rotate in proportion to axial rate of the rod relative to the threaded shaft in correspondence with actuation of the movable device by the actuator.

In one aspect, the flight control member is a nose cone.

In one aspect, the joint is a Rzeppa joint.

In one aspect, at least one of the linear members is an inerter integrated within a hydraulic actuator with the hydraulic actuator including a piston attached to a movable rod and the piston extending across a housing chamber and forming a first chamber and a second chamber each configured to hold hydraulic fluid.

One aspect is directed to a method of changing a relative orientation of a flight control member of an aircraft that is movably connected by a joint to a base of the aircraft. The flight control member is operatively connected to an inner race of the joint and the base is operatively connected to an outer race of the joint. The flight control member includes an extension member that extends through the inner race and into the base. The base includes linear members connected to the extension member; the method includes displacing the second end of the extension member relative to the base thereby changing an angular orientation of the flight control member relative to the base in two degrees of freedom while preventing rotation of the flight control member relative to the base about an axis of the extension member and changing a relative orientation of the inner race relative to the outer race. The method also includes sensing the relative orientation between the inner race and the outer race.

In one aspect, the method includes using an actuator and displacing the second end of the extension member relative to the base by actuating the flight control member through movement of the extension member using the actuator, axially accelerating, using an inerter coupled to the actuator, a first terminal relative to a second terminal of the inerter simultaneous with and in proportion to actuation of the extension member, rotationally accelerating a flywheel of the inerter in proportion to and simultaneous with the axial acceleration of the first terminal relative to the second terminal, and reducing actuator load oscillatory amplitude of the flight control member and the actuator in response to rotationally accelerating the flywheel.

In one aspect, reducing actuator load oscillatory amplitude includes reducing actuator load oscillatory amplitude at resonance of the flight control member.

In one aspect, the inerter is integrated into the actuator with the actuator being a hydraulic actuator having a piston coupled to an end of a rod and axially slidable within a housing, and the flywheel is rotatably coupled to one of the piston and the rod with the flywheel being threadably coupled to a threaded shaft.

In one aspect, the method includes actively controlling rotation of the flywheel in correspondence with actuation of the flight control member by the actuator.

In one aspect, actively controlling rotation of the flywheel includes dynamically braking, using at least one of a motor and a brake, the flywheel as the actuator is moving the extension member.

In one aspect, actively controlling rotation of the flywheel includes dynamically damping, using at least one of a motor and a brake, the flight control member as the actuator is moving the extension member.

BRIEF DESCRIPTION OF THE DRAWINGS

FIG. 13 is a sectional view of a linear member that includes an inerter integrated with an actuator.

FIG. 14 is a sectional view of a linear member that includes an inerter integrated with an actuator.

FIG. 17 is a sectional view of a linear member that includes an inerter integrated with an actuator.

FIG. 18 is a sectional view of a section of the linear member of FIG. 17.

DETAILED DESCRIPTION

The present disclosure is directed to methods and devices for adjusting a position of a flight control member relative to a base of an aircraft. The devices and methods include a joint that movably connects the flight control surface to the base. An extension member is connected to the flight control surface and extends through the joint. Adjustable linear members of the base are connected to the extension member and configured to adjust the position of the extension member. This adjustment results in re-orienting the flight control member relative to the base to adjust the flight of the aircraft.

Figure 1:
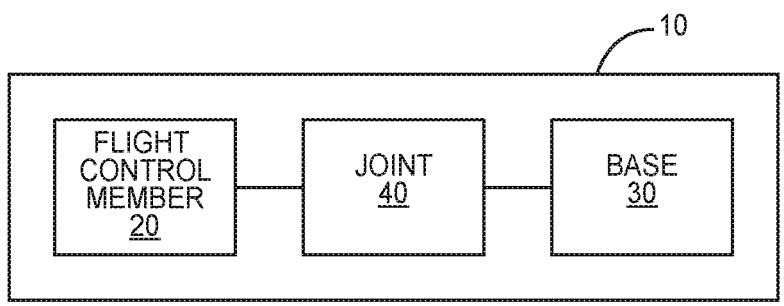
FIG. 1 is a schematic diagram of an aircraft including a flight control member and base connected by a joint.

FIG. 1 schematically illustrates an aircraft 10 that includes a flight control member 20 and a base 30. The flight control member 20 and base 30 are movably connected together through a joint 40. The flight control member 20 includes one or more surfaces that affect the flight of the aircraft 10. The flight control member 20 is moved as necessary to adjust the orientation relative to the base 30.

Figure 2:
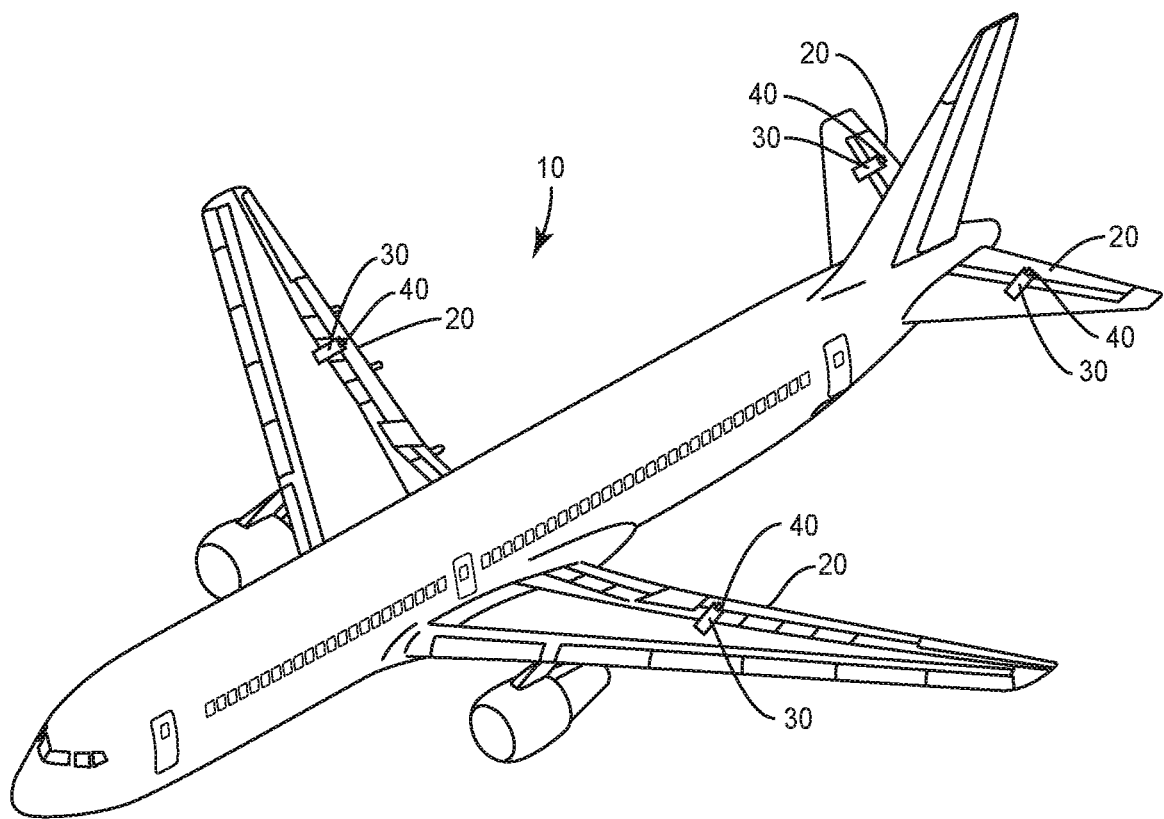
FIG. 2 is a schematic diagram of an aircraft.

FIG. 2 illustrates an aircraft 10 that include a flight control member 20 connected by a joint 40 to a base 30. The flight control member 20 includes a conical flight control member that is attached to an end of the base 30. The orientation of the flight control member 20 can be adjusted relative to the base 30 to steer the aircraft 10. The flight control member 20 can include the entirety of the cone, or one or more discrete sections of the cone.

Figure 3:
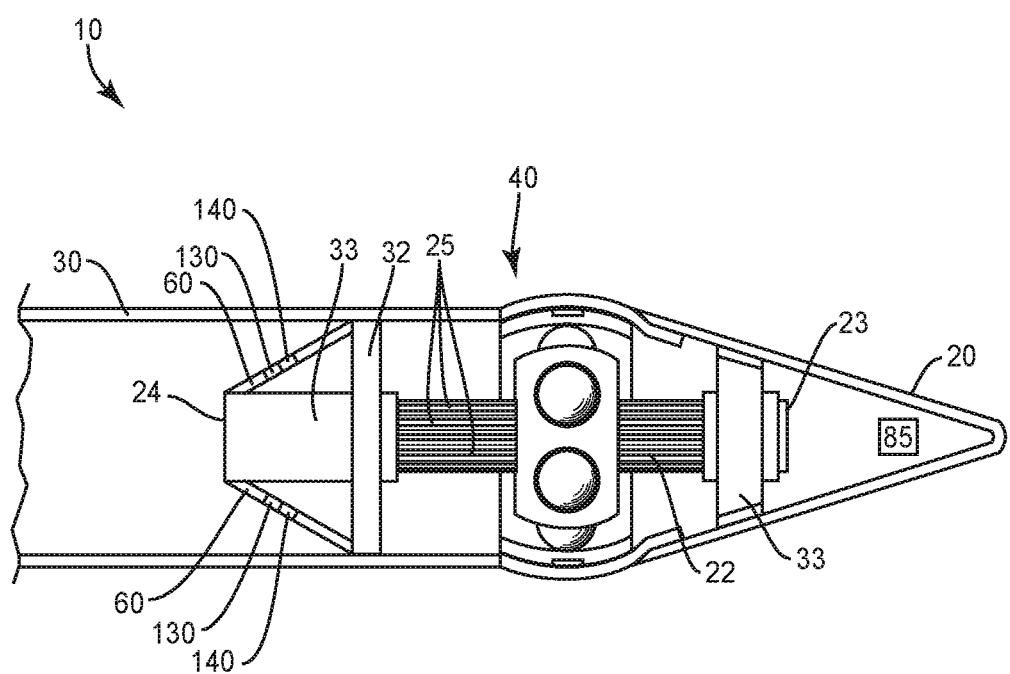
FIG. 3 is a schematic view of an interior of an aircraft with a joint that connects a flight control member to a base.

FIG. 3 schematically illustrates the interior of the aircraft 10 illustrated in FIG. 2. Much of the explanation that follows will be directed to this embodiment of an aircraft 10. However, the disclosed concepts apply to other aircraft 10, including but not limited to the aircraft 10 as illustrated in FIG. 2B.

As illustrated in FIG. 3, the flight control member 20 includes a cone with a conical shape to facilitate movement through the air. Fixed fins can be positioned on the flight control member 20. The fins provide additional surface area that is in motion to steer the aircraft 10. An elongated extension member 22 extends from the flight control member 20 into the base 30. The extension member 22 includes a first end 23 and an opposing second end 24. The extension member 22 can include splines 25 that extend longitudinally along the length. The splines 25 can extend the entire length of the extension member 22, or a shorter distance that includes the intermediate section where the extension member 22 extends through the joint 40. The extension member 22 can include various sectional shapes, including a circular shape. The base 30 can include a front edge that conforms to the shape of the back edge of the flight control member 20.

Linear members 60 extend between the base 30 and the second end 24 of the extension member 22. The linear members 60 are adjustable in length and work in combination to move the second end 24 of the extension member 22 and adjust the position of the flight control member 20 relative to the base 30. The linear members 60 can include an integrated actuator 130 and inerter 140. The actuator 130 provides a positive force to move the extension member 22 to adjust a relative position of the flight control member 20 to a commanded position in response to a command input. The inerter 140 provides for control and damping of displacements of the extension member 22 and flight control member 20. The inerter 140 can reduce actuator load oscillatory amplitude at resonance (e.g., at a resonant frequency) which can correspond to the flutter frequency of the flight control member 20. Additionally or alternatively, the inerter 140 can provide additional functionality for improving the dynamic response, such as increasing the actuation rate and/or preventing position overshoot of a commanded position.

Figure 4:
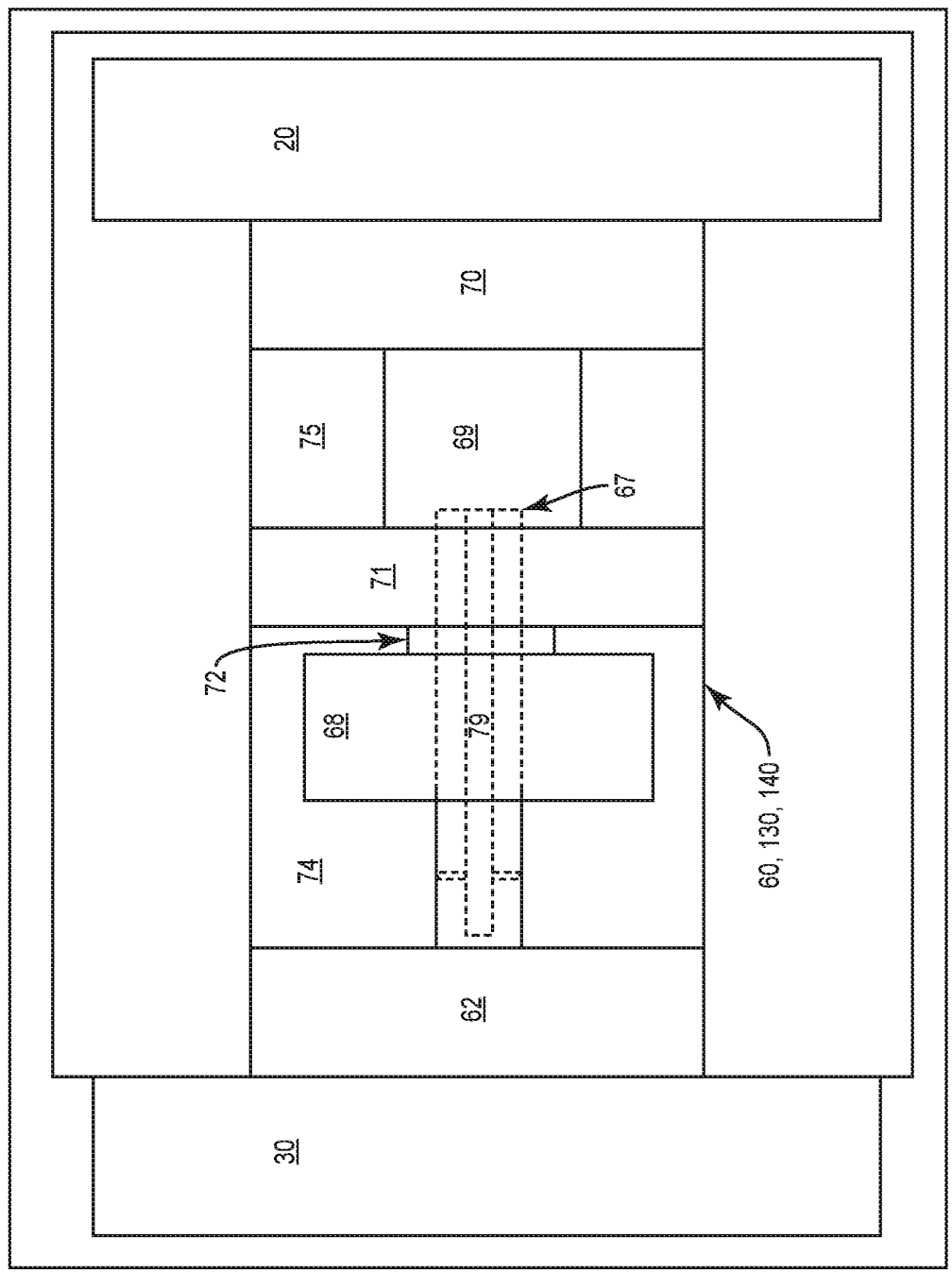
FIG. 4 is a schematic diagram of a linear member with an inerter integrated with an actuator.

FIG. 4 is a block diagram of an example of a linear member 60 that includes an inerter 140 integrated into a hydraulic actuator 130 coupled between a base 30 and a flight control member 20. The actuator 130 is a linear hydraulic actuator having a piston 71 coupled to a rod 69 (e.g., piston rod) and axially slidable within a housing (not shown). The flywheel 68 of the inerter 140 is rotatably coupled to the piston 71 at a flywheel annulus 79. The flywheel 68 is threadably coupled to a threaded shaft 67 and configured to rotationally accelerate in proportion to axial acceleration of the piston 71 and rod 69 relative to the threaded shaft 67. The flywheel 68 can be rotatably coupled to the piston 71 or the flywheel 68 can be rotatably coupled to a first terminal 62.

The threaded shaft 67 can include a shaft bore open on the free end and having radial passages to allow hydraulic fluid to flow from a cap end chamber 74, through the shaft bore, and out of the free end of the threaded shaft 67 to allow the fluid to lubricate moving parts of a bearing and/or the flywheel annulus 79. The linear members 60 can be positioned with either of the first terminal 62 and the second terminal 63 connected to either the base 30 or the flight control member 20.

Figure 5:
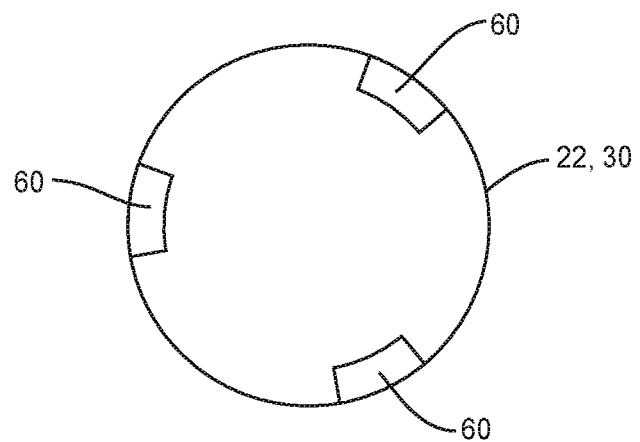
FIG. 5 is a schematic view of three linear members spaced around an interior of a base.

The linear members 60 can be spaced apart about the extension member 22 and base 30. As illustrated in FIG. 5, the linear members 60 are equally spaced apart about each of the extension member 22 and base 30. In a design with three linear members 60, the linear members 60 may be spaced apart by about 120° about the perimeters of the extension member 22 and base 30. Other designs can include fewer or more linear members 60.

Figure 6:
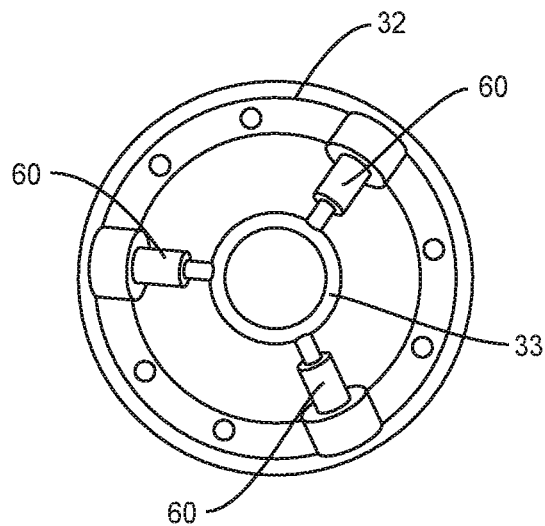
FIG. 6 is a top view of three linear members that extend between a collar and a mount.

The linear members 60 can connect directly to the interior sidewall of the base 30. Alternatively, the linear members 60 can be connected to a collar 32 that is connected to the interior of the base 30. The collar 32 can be connected by one or more mechanical fasteners, adhesives, soldering, brazing. The collar 32 is spaced away from the joint 40 such that the linear members 60 extend away from the collar 32 to connect to the extension member 22. FIG. 6 illustrates a collar 32 configured to be mounted to the interior of the skin 31. Linear members 60 are attached around the collar 32 and extend to and are connected to a mount 33 that is fixedly connected to the extension member 22. The linear members 60 can also be connected directly to the extension member 22.

With multiple linear members 60, one or more of the linear members 60 can be extended which causes one or more opposing linear members 60 to retract. In a design with three linear members 60, this can include two of the linear members 60 being extended which forces the third linear member 60 to retract.

Figure 7:
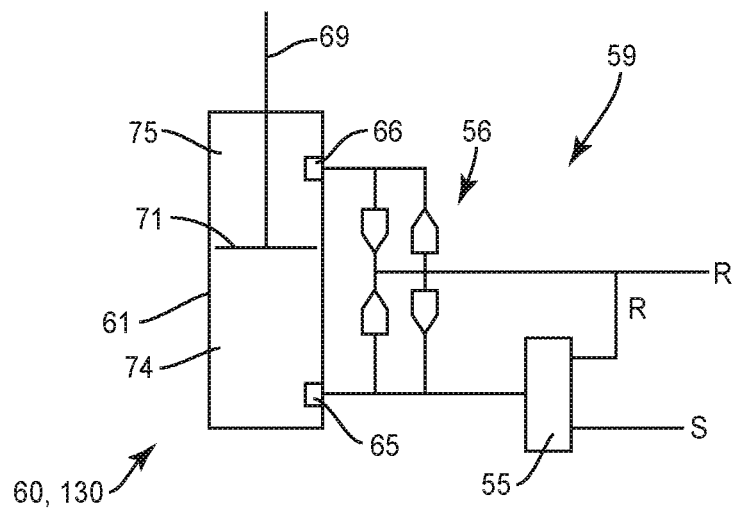
FIG. 7 is a schematic diagram of a 3 way valve and hydraulic system for supplying hydraulic fluid to a linear member.

FIG. 7 illustrates a schematic diagram of the linear member 60 and hydraulic system 59 that provides the hydraulic fluid. The hydraulic system 59 includes one or more pumps that move the hydraulic fluid. The hydraulic system 59 can also include one or more reservoirs for storing hydraulic fluid.

FIG. 7 illustrates the linear member 60 that receives fluid through the hydraulic system. For purposes of clarity, just the actuator 130 is illustrated and includes the piston 71 and rod 69 within a housing 61. The piston 71 divides the interior of the chamber 64 into the cap end chamber 74 and the rod end chamber 75. The actuator 130 can be unbalanced with one side of the piston 71 having a greater cross-sectional area than the opposite piston side. In one design, the piston side facing into the cap end chamber 74 includes a larger cross-sectional area. Other designs can include a balanced actuator with equal cross-sectional area on both piston sides.

The valve 55 supplies hydraulic fluid to both the cap end chamber 74 and the rod end chamber 75. When the actuator 130 is unbalanced with larger piston surface towards the cap end chamber 74, the hydraulic fluid causes the actuator 130 to be extended. This force maintains a bias load on the joint 40 which prevents joint backlash and enhances the responsiveness of the joint 40. With a balanced actuator 130, a bias load can also be applied to the joint 40 through the use of pressure differentials in the hydraulic fluid in the cap end chamber 74 and the rod end chamber 75.

With three linear members 60, the extension of two of the linear members 60 causes the third linear member 60 to retract using the three-way valve 55 of FIG. 7. During extension of the two actuators 130, pressurized hydraulic fluid is moved through a supply line S and three-way valve 55 and into the cap end chamber 74. This causes the piston 71 to extend outward from the housing 61. This movement of the piston 71 in turn forces fluid out of the rod end chamber 75. A valve arrangement is configured to move the exiting hydraulic fluid to a return line R.

The linear member 60 opposing the two extending linear members 60 will retract due to forces applied to the piston rod 69 that move the piston 71 towards the cap end chamber 74. This piston 71 movement forces the hydraulic fluid through the port 65. Valve 55 and valve arrangement 56 meter the fluid that exits the cap end chamber 74 which assures the command orientation is under control. During retraction and extension, fluid volume is maintained in both the cap end chamber 74 and the rod end chamber 75 to provide stiffness that enables high closed-loop responsiveness.

Designs with different numbers of multiple linear members 60 can operate in the same manner through the use of a three-way valve 55. One or more of the linear members 60 are extended resulting in retracting of one or more opposing linear members 60.

Figure 8:
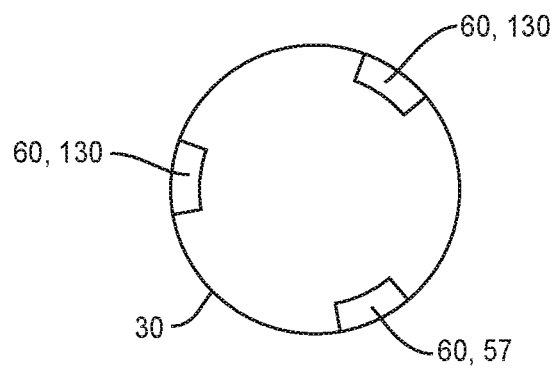
FIG. 8 is a schematic diagram of three linear members attached to a base.

FIG. 8 includes a design that includes a pair of linear members 60 with hydraulic actuators 130. Each of the actuators 130 is equipped with a three-way valve 55 to supply hydraulic fluid to the cap end chamber 74 and the rod end chamber 75 as disclosed above. The third linear member 60 is a spring 57 that applies a force to bias the joint 40. The spring 57 is configured to apply a required stiffness to the joint 40.

Figure 9:
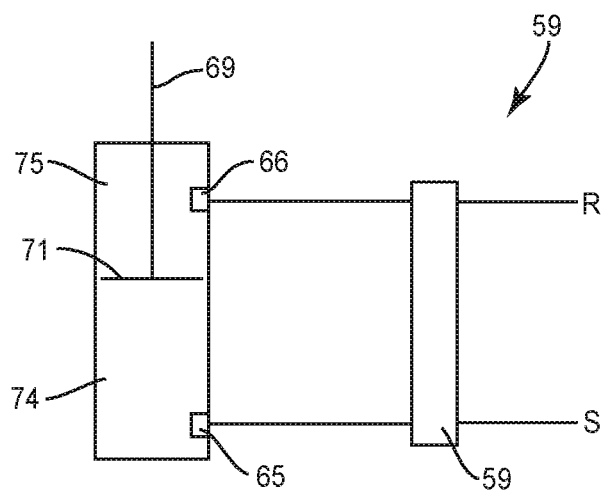
FIG. 9 is a schematic diagram of a 4 way valve and hydraulic system for supplying hydraulic fluid to a linear member.

FIG. 9 includes a four-way valve 58 that directs the hydraulic fluid into and out of the end cap chamber 74 and the rod end chamber 75. The four-way valve 58 supplies and removes the hydraulic fluid from each chamber 74, 75 with the hydraulic fluid being supplied at the necessary relative pressures that move the piston 71 and extend and retract the rod 69 as necessary.

Figure 10:
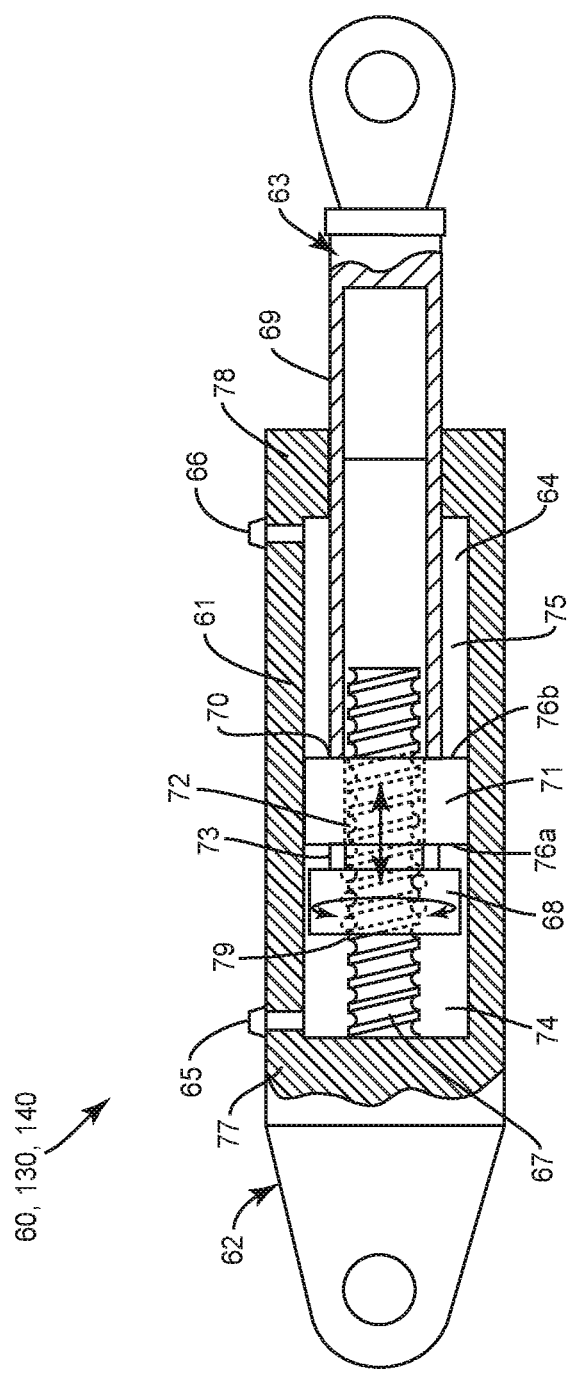
FIG. 10 is a sectional view of a linear member that includes an inerter integrated with an actuator.

A variety of different linear members 60 that include integrated actuators 130 and inerters 140 can be used in the aircraft 10. FIG. 10 includes a linear member 60 with an inerter 140 integrated with an actuator 130. The linear member 60 includes a first terminal 62 that includes a housing 61, and a second terminal 63 that includes the rod 69. Each of the first and second terminals 62, 63 can be configured to attached to either the extension member 22 or base 30. Each of the first and second terminals 62, 63 can include an opening that receives a fastener to provide for the connection.

The housing 61 extends around and encloses a chamber 64 that extends between end walls 77, 78. The chamber 64 includes a port 65 towards the end wall 77 and a port 66 towards the end wall 78. The ports 65, 66 provide for the pressurized hydraulic fluid to enter and exit the chamber 64. A threaded shaft 67 extends outward from the end wall 77 and into the chamber 64. A flywheel 68 is threaded onto the shaft 67 and is movable by relative rotation along the length. The flywheel 68 rotates in proportion to an axial rate of the rod 69 that extends through an opening in the end wall 78 of the housing 61. The rod 69 includes an inner end 70 that is hollow and extends around the threaded shaft 67.

The piston 71 is mounted to the inner end 70 of the rod 69. The piston 71 includes an outer diameter that substantially matches the inner diameter of the chamber 64. A seal (not illustrated) such as an O-ring can extend around the outer perimeter of the piston 71 to seal against the wall of the chamber 64. The piston 71 is axially slidable within the chamber 64 and divides the chamber 64 into the cap end chamber 74 positioned between the piston 71 and the end wall 77 of the housing 61, and the rod end chamber 75 positioned between the piston 71 and the end wall 78 of the housing 61. The piston 71 includes a first face 76a and an opposing second face 76b. The piston 71 can provide for an unbalanced setting with one of the piston sides 76a, 76b having a greater cross-sectional area than the opposite piston side 76a, 76b. The piston 71 also includes an inner opening 72 that extends around the shaft 67.

The flywheel 68 is mounted in the cap end chamber 74 and is rotatably coupled to the piston 71 at a flywheel annulus 79. The flywheel 68 is configured to rotationally accelerate in proportion to axial acceleration of the piston 71 and piston rod 69 relative to the shaft 67. A bearing 73 can be positioned along the shaft 67 between the flywheel 68 and the piston 71.

Figure 11:
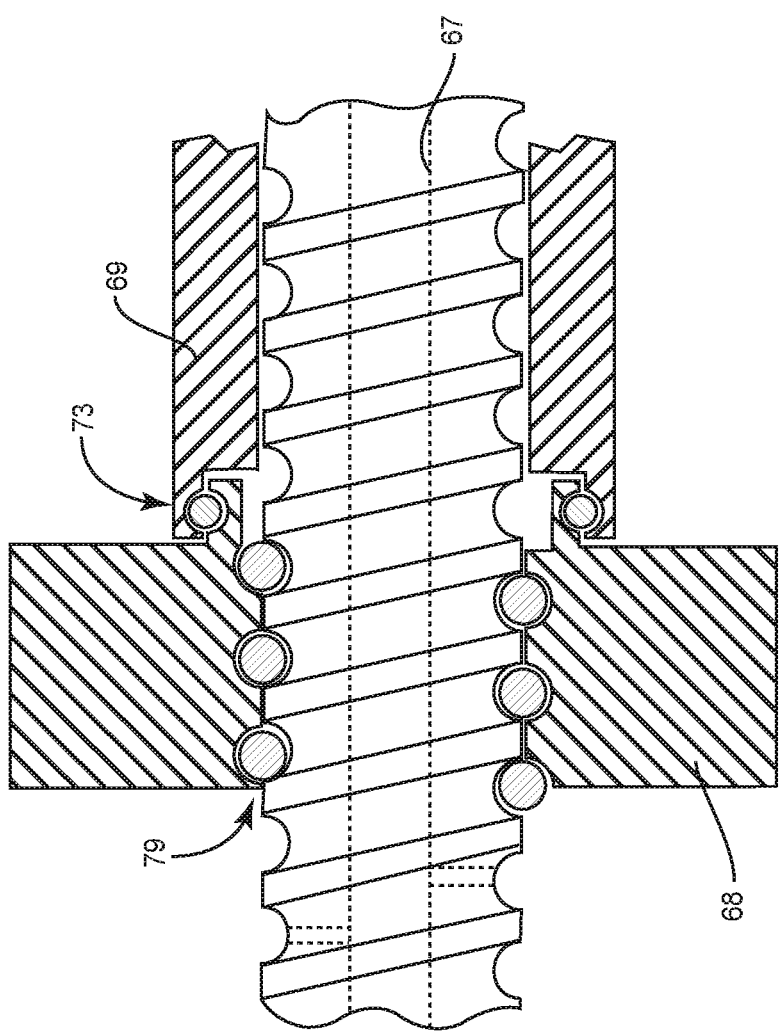
FIG. 11 is a sectional view of a flywheel on a shaft and connected to a rod.

FIG. 11 illustrates a magnified sectional view of FIG. 10 illustrating the flywheel 68 coupled to the rod 69 at the flywheel annulus 79. The flywheel annulus 79 is also threadably engaged to the shaft 67. The shaft 67 can be configured as a ball screw with helical grooves for receiving ball bearings which couple similarly-configured helical grooves in the flywheel annulus 79 to the ball screw with minimal friction. Although not illustrated, the flywheel annulus 79 can include a ball nut for circulating the ball bearings coupling the flywheel 68 to the ball screw. In another example not shown, the threaded shaft 67 can include a lead screw with threads to which the flywheel annulus 79 are directly engaged. The flywheel 68 can be configured for engagement to any one of a variety of different types of configurations of threaded shafts, and is not limited to the ball screw.

FIG. 11 also illustrates a bearing 73 for coupling the flywheel annulus 79 to the rod 69 such that the rod 69 and flywheel 68 can translate in unison as the flywheel 68 rotates due to threadable engagement with the threaded shaft 67. Although the bearing 73 is shown as a bearing, the bearing 73 can be provided in any one a variety of different configurations capable of axially coupling the flywheel 68 to the rod 69 with a minimal amount of axial free play. For example, the bearing 73 can be configured as a roller bearing (not shown). In still further examples, the flywheel 68 can be coupled to the rod 69 without a bearing while still allowing the flywheel 68 to rotate during translation of the rod 69 and flywheel 68 relative to the threaded shaft 67.

Figure 12:
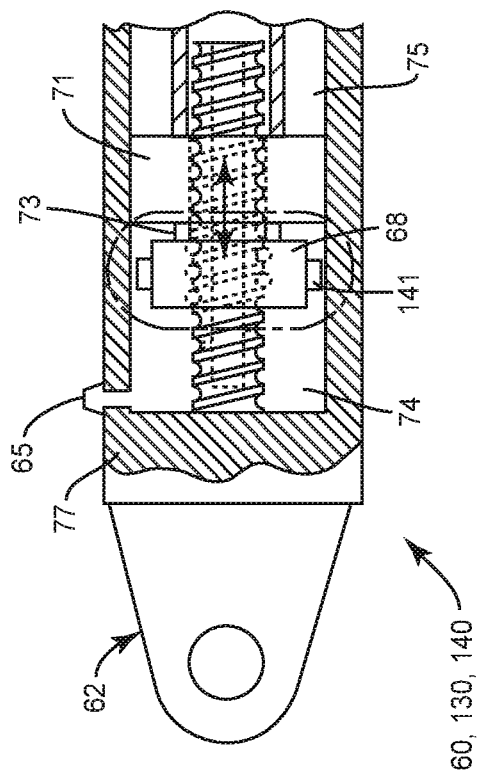
FIG. 12 is a sectional view of a flywheel including protrusions.

FIG. 12 illustrates a linear member 60 with an integrated inerter 140 and actuator 130. The inerter 140 includes protrusions 141 for generating viscous damping during rotation of the flywheel 68 when the flywheel 68 is immersed in the hydraulic fluid in the cap end chamber 74. The protrusions 141 generate or increase the viscous damping capability of the inerter 140 during rotation of the flywheel 68, and thereby increase the damping capability of the inerter 140. The protrusions 141 extend radially outward and are circumferentially spaced around a perimeter of the flywheel 68. During rotation of the flywheel 68, the protrusions 141 generate viscous damping capability and add to the inerting capability of the inerter 140. The protrusions 141 can extend outward from various portions of the flywheel 68, including one or both of the opposing sides of the flywheel 68. The protrusions 141 can include various geometric sizes, shapes or configurations.

FIG. 13 illustrates another linear member 60 that includes an inerter 140 integrated into a hydraulic actuator 130. The actuator 130 is a non-balanced actuator. The actuator 130 includes an interior piston 131 coupled to a free end of the threaded shaft 67. The interior piston 131 can be axially slidable within the interior of the rod 69 such that the interior piston 131 is non-rotatable relative to the interior of the rod 69 during axial movement of the rod 69 relative to the threaded shaft 67. The perimeter of the interior piston 131 can be sealed (e.g., via an O-ring) to an interior wall of the rod 69. The inclusion of the interior piston 131 can reduce the total volume of hydraulic fluid required to fill the rod end chamber 75 during extension of the rod 69 relative to the increased volume of hydraulic fluid required to fill the cap end chamber 74.

FIG. 14 is another linear member 60 that includes an inerter 140 integrated into a hydraulic actuator 130. The hydraulic actuator 130 is configured as a balanced actuator having opposing faces 76a, 76b of the piston 71 with substantially equivalent cross-sectional areas. The housing 61 can include a separator wall 132 separating the portion of the housing 61 containing the flywheel 68 from the portion of the housing 61 containing the piston 71. The cap end chamber 74 is located on one of the sides of the piston 71 and a rod end chamber 75 is located on the opposite side of the piston 71. The piston 71 is mounted on the rod 69. One end of the rod 69 extends through the end wall 78 and terminates at an end of the rod 69. The rod 69 extends through the separator wall 132 with the inner end 70 positioned on an opposing side. The flywheel 68 is rotatably coupled to the rod 69 in a manner as described above.

Figure 15:
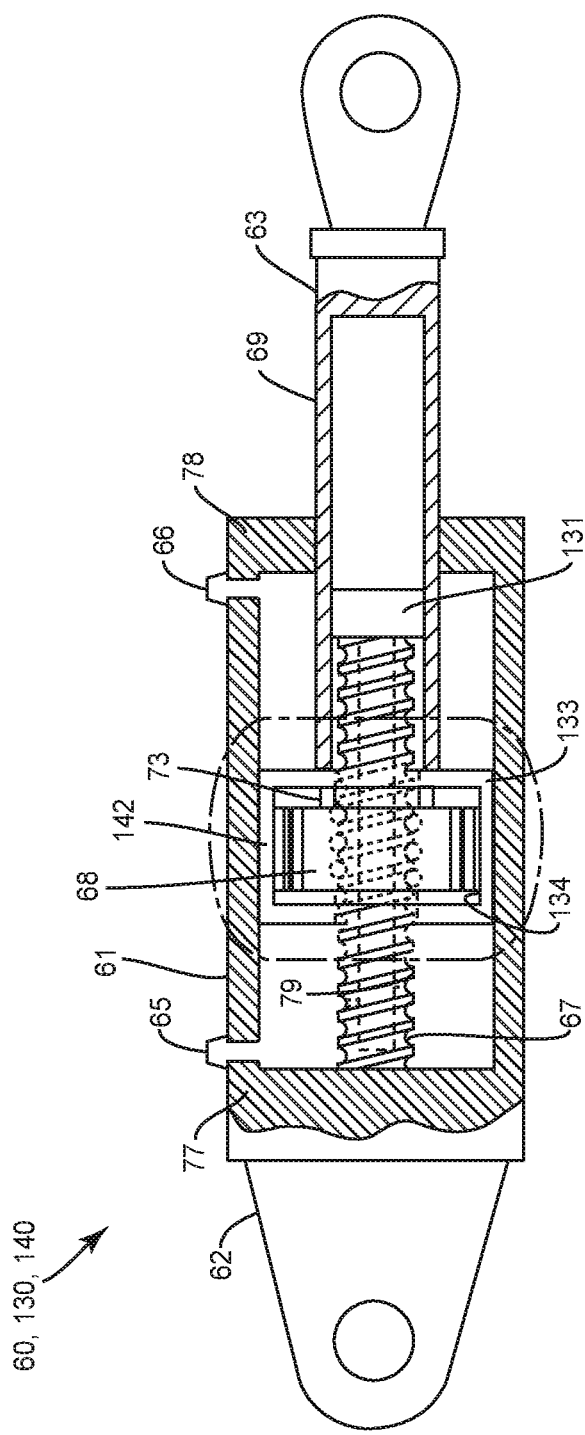
FIG. 15 is a sectional view of a linear member that includes an inerter integrated with an actuator.
Figure 16:
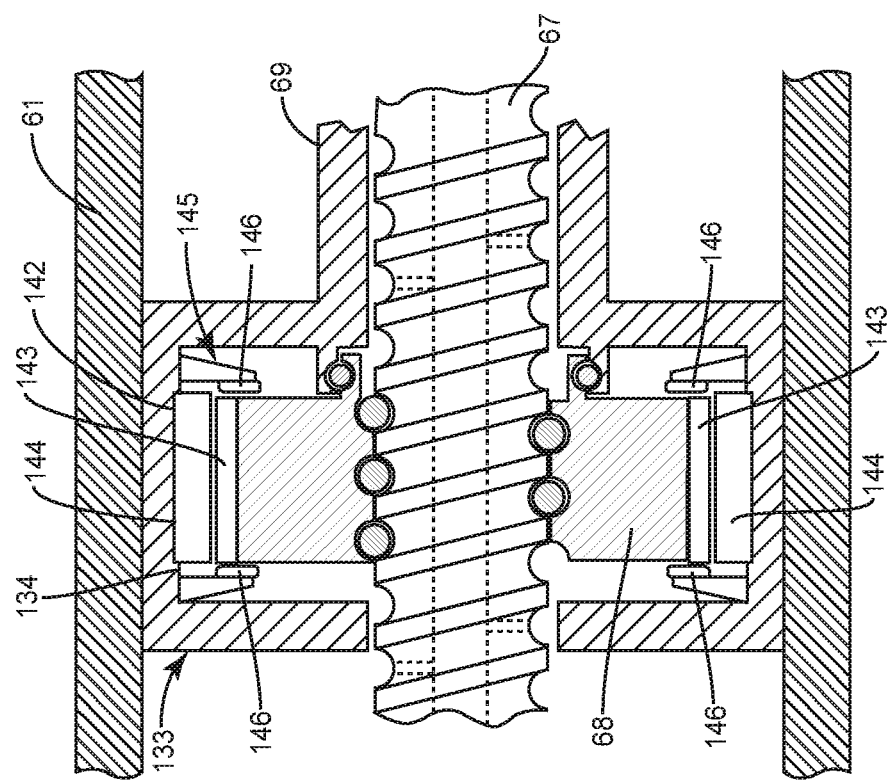
FIG. 16 is a sectional view of a section of the linear member of FIG. 15.

FIG. 15 includes a linear member 60 with an inerter 140 integrated with an actuator 130. The inerter 140 includes an electric flywheel motor 142 as illustrated in FIG. 16 to facilitate active control of rotation of the flywheel 68 rotation using electromotive force from the integrated flywheel motor 142. Active control can include using the flywheel motor 142 to apply a torque to the flywheel 68 to resist or aid the torque that is generated by the flywheel 68 due to axial acceleration of the first terminal 62 relative to the second terminal 63. The flywheel motor 142 can be configured to provide active damping and/or active braking of the actuator 130 and the load inertia.

As illustrated in FIG. 16, the flywheel 68 is rotatably coupled to and contained within a generally hollow piston 133 which is actually slidable within the actuator housing 61. The flywheel motor 142 is incorporated into the flywheel 68 and the piston 133 and configured to actively control rotation of the flywheel 68 in correspondence with relative axial movement of the rod and threaded shaft 67. The flywheel motor 142 can be operated in a manner to accelerate and/or decelerate the flywheel 68 by applying a torque to the flywheel 68 either in correspondence with (e.g., the same direction as) or in opposition to the direction of rotation of the flywheel 68. In this manner, the flywheel motor 142 can apply a torque to the flywheel 68 to resist or aid the flywheel torque generated due to axial acceleration of the first terminal 62 relative to the second terminal 63.

The flywheel motor 142 can be a permanent magnet direct-current (DC) motor having one or more permanent magnets 143 mounted to the flywheel 68. For example, a plurality of permanent magnets 143 can be circumferentially spaced around the flywheel perimeter. In addition, the flywheel motor 142 can include a plurality of windings 144 mounted to the piston 133. In one example, a plurality of windings 144 can be circumferentially spaced around the piston inner wall 134. In another example, a plurality of windings 144 can be circumferentially spaced around the side wall of the housing 61. In other examples, the flywheel motor 142 can be a brushless DC motor or some other motor configuration, and is not limited to a permanent magnet DC motor configuration. In an example not shown, a linear position sensor can be included with the actuator 130 to sense the linear position of the piston 133 and generate a signal representative of the linear piston position for commutating the flywheel motor 142 in correspondence with the piston position.

The flywheel motor 142 can be configured to assist or aid in rotating the flywheel 68 for a commanded direction of motion. For example, the flywheel motor 142 can provide a torque to accelerate the flywheel 68 at the start of motion of the extension member 22 toward a commanded position. The torque applied to the flywheel 68 by the flywheel motor 142 can be approximately equal in magnitude to the torque required to rotationally accelerate the flywheel 68 due to axial acceleration of the threaded shaft 67 relative to the rod 69. By using the flywheel motor 142 to remove the torque required to rotationally accelerate the flywheel 68, the piston 133 can move more quickly to a commanded position than if the flywheel motor 142 did not accelerate the flywheel 68. In this manner, the flywheel motor 142 can allow faster responsiveness of the extension member 22 than a conventional actuator.

In a further example of active control, the flywheel motor 142 can be operated in a manner to provide a torque to decelerate the flywheel 68 as the extension member 22 approaches a commanded position. In this regard, the flywheel motor 142 can be operated as a brake to oppose the flywheel torque generated by the axial deceleration of the shaft 67 relative to the rod 69. Actively controlling rotation of the flywheel 68 in this manner can prevent or limit position overshoot of the extension member 22 and thereby increase the stability of the extension member 22. In such an arrangement, the actuator 130 and inerter 140 can be configured with a failure mode that ensures that without active motor control, the actuator 130 is capable of exhibiting a desired damped response in a manner preventing underdamping of the extension member 22.

Referring still to FIG. 16, in another example of active control, the flywheel motor 142 can include a brake 145 configured to provide dynamic braking of the flywheel 68. In this regard, the brake 145 can be operated in a manner to decelerate the flywheel 68 or to increase existing deceleration of the flywheel 68. For examples that include a flywheel motor 142, the brake 145 can be operated in a manner to increase existing deceleration of the flywheel 68 caused by rotational drag of the flywheel motor 142. In addition, the flywheel motor 142 can be operated in a manner to oppose disturbances (e.g., undesirable motion) of the actuator 130.

The brake 145 can be configured as a disc brake having brake pads 146. The flywheel 68 can function as a brake rotor against which the brake pads 146 can be frictionally engaged during braking. In other examples not shown, a separate brake rotor can be provided which can be directly or indirectly coupled to the flywheel 68. In the example shown, a hydraulic brake cylinder (not shown) can be included to actuate the brake pads 146 into frictional engagement with one or both of the opposing axial faces (e.g., planar faces) of the flywheel 68 for decelerating the flywheel 68. The brake 145 can include at least two pairs of opposing brake pads 146 located on diametrically opposing sides of the brake rotor. Each pair of brake pads 146 can be held in position by a bracket. Although the brake 145 is described and illustrated as a disc brake, the inerter 140 can incorporate one or more different types of brakes such as a drum brake or any other type of brake capable of decelerating the flywheel 68.

FIG. 17 illustrates another linear member 60 with an inerter 140 integrated into a hydraulic actuator 130. The flywheel 68 is rotatably coupled or attached to the end wall 77 of the housing 61 of the first terminal 62. The piston 71 is attached to the rod 69 which extends from the piston 71 through the end wall 78 of the housing 61. In an alternative example not shown, the flywheel 68 can be rotatably coupled to the end wall 77 of the housing 61 is part of the first terminal 62, and the rod 69 is coupled to the second terminal 70.

FIG. 18 is a magnified sectional view of FIG. 17 illustrating the flywheel annulus 79 rotatably coupled by a bearing 147 to the end wall 77. The shaft 67 is fixedly coupled to the flywheel 68 and is rotatable in unison with the flywheel 68. The piston 71 is fixedly coupled to the rod 69 and threadably engaged to the shaft 67 in a manner such that linear translation of the rod 69 relative to the shaft 67 causes rotation of the flywheel 68 and shaft 67 in unison. Axial movement of the shaft 67 relative to the rod 69 can be in correspondence with actuation of the extension member 22 by the actuator 130.

Figure 19:
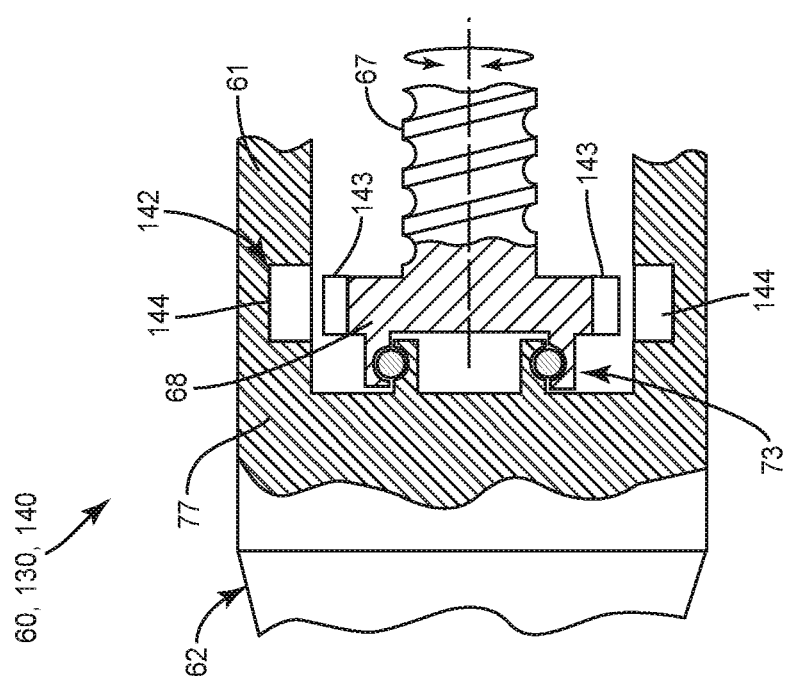
FIG. 19 is a sectional view of a section of the linear member.

FIG. 19 illustrates an example of a flywheel 68 rotatably coupled to the end wall 77 and incorporating a flywheel motor 142 for active control of the rotation of the flywheel 68 in a manner as described above. The flywheel motor 142 can include permanent magnets 143 mounted to the flywheel perimeter. A plurality of permanent magnets 143 can be circumferentially spaced around the flywheel perimeter. A plurality of windings 144 can be circumferentially spaced around the actuator side wall of the housing 61.

Figure 20:
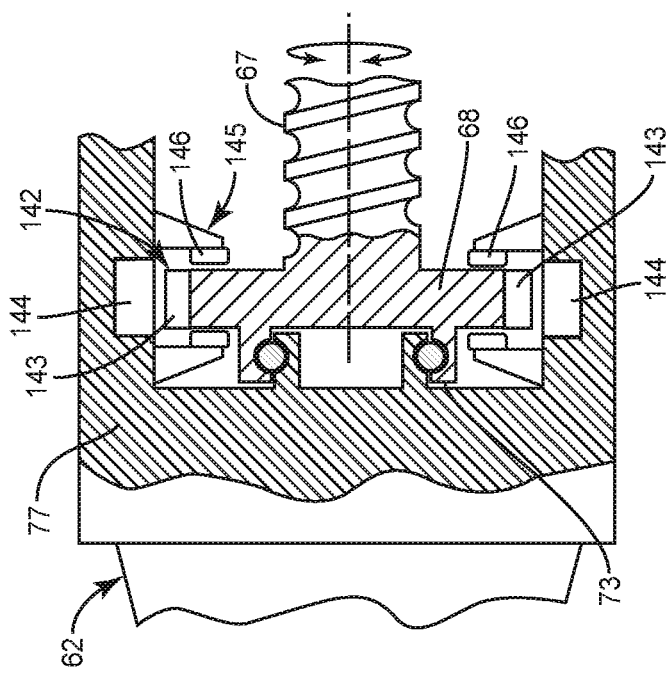
FIG. 20 is a sectional view of a section of the linear member.

FIG. 20 illustrates an example of a flywheel 68 including a brake 145 configured to provide dynamic braking of the flywheel 68. The brake 145 is configured as a disc brake having one or more pairs of brake pads 146 for frictionally engaging opposing axial faces of the flywheel 68. The brake 145 can be configured and operated similar to the arrangement illustrated in FIG. 16 described above.

The use of the inerter 140 allows for a reduction in the overall size and weight of the linear member 60 without the potential for oscillatory response. More specifically, the inerter 140 allows for a reduction in the inertial load on the actuator 130 which, in turn, allows for a reduction in a cross-sectional area of the piston 71 and a decrease in the size and weight of other components of the hydraulic system 59 including reservoirs, tubing diameter, accumulators, pumps, and other components. In this regard, the inerter 140 increases the power density for a hydraulic actuator system where dynamic response is limited by piston cross-sectional area or load inertia.

Figure 21:
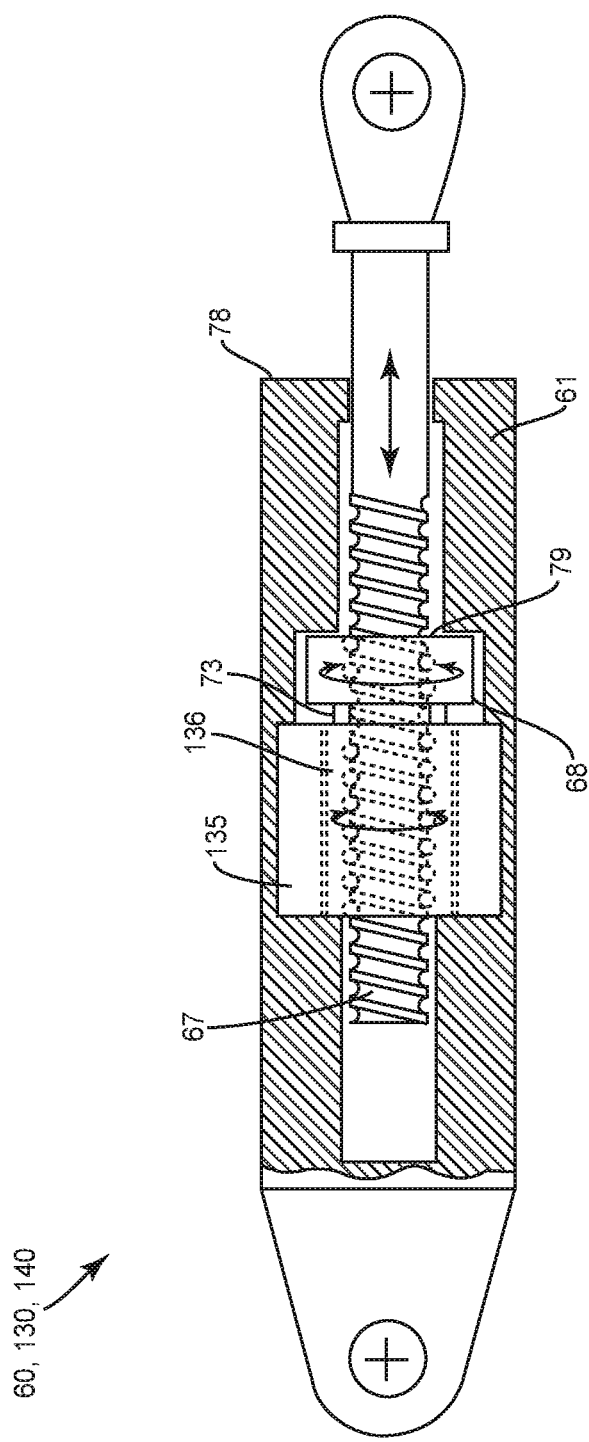
FIG. 21 is a sectional view of a linear member that includes an inerter integrated with an actuator.

The linear members 60 can also include electro-mechanical actuators 140. FIG. 21 illustrates a linear member 60 with an electro-mechanical actuator 130 and integrated inerter 140. The electro-mechanical actuator 130 can include a threaded shaft 67 (e.g., an Acme-threaded shaft, a ball screw, etc.) extending through an actuator motor 135 and extending outward beyond the end wall 78 of the housing 61. The actuator motor 135 can be operably coupled to the shaft 67 by a motor-shaft coupler 136 that can be threadably engaged to the shaft 67. Operation of the actuator motor 135 can cause axial motion of the shaft 67 for actuating the extension member 22. In this regard, the shaft 67 can axially move in proportion (e.g., in magnitude and direction) to angular displacement of the actuator motor 135. The flywheel 68 can be threadably engaged to the shaft 67. In addition, the flywheel annulus 79 can be rotatably coupled to the actuator motor 135 via a bearing 73 such that axial acceleration of the shaft 67 causes rotational acceleration of the flywheel 68. The flywheel 68 can be configured to rotationally accelerate and decelerate in proportion to axial acceleration and deceleration of the shaft 67 (e.g., relative to the actuator motor 135) during actuation of the extension member 22.

Rotation of the flywheel 68 during actuation of the electro-mechanical actuator 130 of FIG. 21 can provide any one or more of the advantages described herein for improving the dynamic response of the extension member 22 during actuation by the electro-mechanical actuator 130. For example, the flywheel 68 can reduce actuator load oscillatory amplitude at resonance of the coupled electro-mechanical actuator 130/extension member 22/flight control member 20. In addition, although not shown in FIG. 21, a flywheel motor and/or a dynamic brake 360 as described above can optionally be included with the flywheel 68 to allow for active control of the rotation of the flywheel 68.

In use, the actuator 130 of the linear member 60 is actuated to move the extension member 22 which in turn moves the flight control member 20. During the movement between the first and second terminals 62, 63, the flywheel 68 is rotationally accelerated simultaneous with the axial acceleration of the first terminal 62 relative to the second terminal 63. The axial acceleration of the first terminal 62 relative to the second terminal 63 is simultaneous with and in proportion to the actuation of the extension member 22 by the actuator 130. In this regard, the flywheel 68 rotationally accelerates and decelerates in proportion to the axial acceleration and deceleration of the first terminal 62 relative to the second terminal 63 in correspondence with the actuation of the extension member 22 by the actuator 130.

The rotation of the flywheel 68 dampens the movement of the actuator 130. Rotationally accelerating the flywheel 68 acts to reduce actuator load oscillatory amplitude at resonance of the extension member 22 and attached flight control member 20. In one example, the inerter 140 can reduce actuator load oscillatory amplitude by at least 50% relative to the oscillatory amplitude for the extension member 22 and flight control member 20 actuated by the same actuator 130 but without the inerter 140. The extension member 22 is connected to the flight control member 20 which control the flight of the aircraft 10 and the resonance (e.g., the resonant frequency) can correspond to flutter of the flight control member 20 as induced by aerodynamic forces acting on the flight control member 20.

The dampening by the inerter 140 can include actively controlling the rotation of the flywheel 68 in correspondence with relative axial movement of the piston rod 69 and threaded shaft 67. For example, the inerter 140 can include or incorporate an electric flywheel motor 142 as described above in the examples illustrated in FIGS. 15, 16, 19, and 20. In some examples, as mentioned above, the actuator 130 can include a linear position sensor (not shown) configured to sense the linear position of the piston 71 within the actuator 130 and generate a signal representative of the piston position. The method can include commutating the flywheel motor 142 in correspondence with the linear position of the piston 71 as represented by the signal generated by the position sensor.

Active control of the flywheel 68 rotation can include accelerating and/or decelerating the flywheel 68 using the flywheel motor 142. For example, the flywheel motor 142 can operate in a manner to apply a torque to the flywheel 68 in correspondence with or in the direction of rotation of the flywheel 68. In this regard, the flywheel motor 142 can assist a commanded direction of motion of the actuator 130. In some examples, active control of flywheel rotation can include accelerating the flywheel 68 during initiation of actuation by the actuator 130 of the extension member 22 toward a commanded position. In this regard, the flywheel motor 142 can rotationally accelerate the flywheel 68 at the start of axial acceleration of the first terminal 62 relative to second terminal 63 by an amount at least partially or completely eliminating the force generated at the first terminal 62 and second terminal 63 due to actuation of the extension member 22 by the actuator 130. By using the flywheel motor 142 to rotationally accelerate the flywheel 68 at the start of axial acceleration, the force required to axially move the first terminal 62 relative to the second terminal 63 can be reduced or eliminated which may increase the speed at which the actuator 130 moves the extension member 22 toward a commanded position.

Alternatively, the flywheel motor 142 can be operated in a manner to apply a torque to the flywheel 68 in a direction opposite the rotation of the flywheel 68. In this regard, the application of motor-generated torque in a direction opposite the rotation of the flywheel 68 can resist the torque generated by the relative axial acceleration of the first terminal 62 and second terminal 63. In this regard, active control by the flywheel motor 142 can oppose the terminal-developed torque at the end of actuator 130 motion when the commanded position is reached. In this manner, the step of actively controlling rotation of the flywheel 68 can include using the flywheel motor 142 to dynamically brake or decelerate the flywheel 68 as the actuator 130 approaches a commanded position to prevent position overshoot.

In a further example, active control of flywheel 68 rotation can include using a brake 145 (see FIGS. 16 and 20) to decelerate the flywheel 68 as the actuator 130 approaches a commanded position of the extension member 22 to prevent position overshoot of the commanded position. The method can additionally include dynamically braking the rotation of the flywheel 68 to oppose disturbances (e.g., undesirable motion) of the actuator 130. The step of dynamically braking (e.g., decelerating or reducing rotational speed) of the flywheel 68 can be performed using a brake 145 operatively engageable to the flywheel 68 or operatively engageable to a brake rotor that can be fixedly coupled to the flywheel 68. Alternatively or additionally, the step of dynamically braking the flywheel 68 can be performed using rotational drag generated by the flywheel motor 142 as described above.

Figure 22:
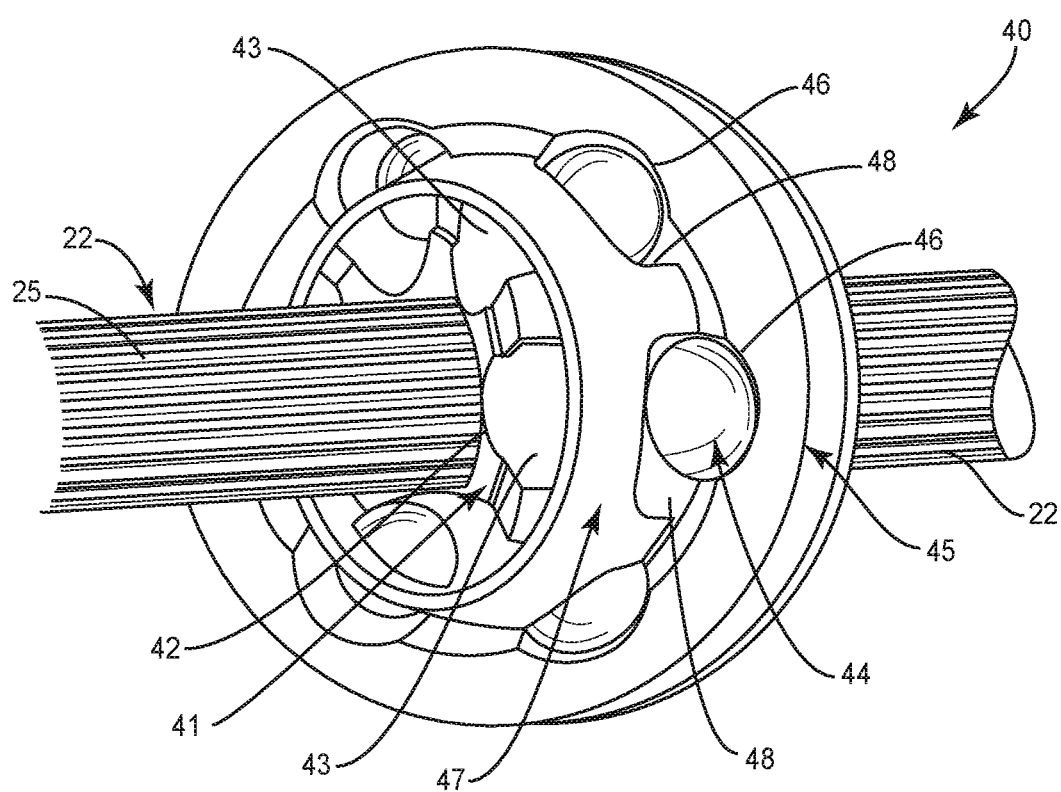
FIG. 22 is a perspective view of an extension member extending through a joint.

The linear members 60 are connected to and move the second end 24 of the extension member 22. The extension member 22 extends through the joint 40 and is connected to the flight control member 20. The joint 40 provides for a spherical degree of freedom of the flight control member 20 relative to the base 30 achieving two degrees of freedom while preventing rotation of the flight control member 20 relative to the base 30 about the longitudinal axis of the extension member 22. FIG. 22 illustrates a joint 40 with an inner race 41 that includes an opening 42 that receives the extension member 22. The opening 42 includes receptacles on an inner side that engage with the splines 25 on the extension member 22 to prevent rotational movement of the extension member 22 within the inner race 41. The inner race 41 also includes grooves 43 along an outer side that are sized to receive a portion of the spherical bearings 44.

An outer race 45 is connected to the base 30 and is sized and shaped to extend around the inner race 41. The outer race 45 includes grooves 46 along an inner side that are sized to receive a portion of the bearings 44. An annular cage 47 is positioned between the inner and outer races 41, 45. The cage 47 includes a circular wall with openings 48 each sized to receive one of the bearings 44. The joint 40 can be configured to include various numbers of balls, with the joint 40 of FIG. 22 including six bearings 44. One type of joint 40 with an inner race 41, an outer race 45 and spherical bearings 44 is a Rzeppa joint.

The inner race 41, outer race 45, and cage 47 each include open sides such that the extension member 22 extends through the joint 40. The inner race 41 has a spherical degree of freedom relative to the outer race 45. Further, the engagement of the bearings 44 within the grooves 43, 46 prevents rotation of the inner race 41 relative to the outer race 45. The relative positioning between the inner race 41 and the outer race 45 changes during movement of the extension member 22 by the linear members 60. When the flight control member 20 and base 30 are in alignment, the inner and outer races 41, 45 are at a first relative position. When the flight control member 20 moves relative to the base 30, the relative positions of the inner and outer races 41, 45 changes.

One or more sensors 80 are positioned to sense the relative positioning between the base 30 and the flight control member 20. FIG. 17 includes a sensor 80 positioned with the outer race 45 to detect the position of the flight control member 20. The sensors are oriented to detect relative linear motion between the base 30 and the flight control member 20.

A variety of different sensors 80 can be used to detect this placement. One type of sensor 80 is an optical navigation sensor that emits a signal via an LED or laser light onto an opposing surface 26. A reflection of the opposing surface 26 is detected by the sensor 80. The reflection can include a microscopic pattern of highlights and shadows or trackable surface structures that can be detected by the sensor 80. A target 27 can also be positioned on the surface 26 that is detected by the sensor 80. The target 27 can include various visual aspects such as patterns, colors, shapes, etc. that can be detected by the sensor 80.

Figure 23:
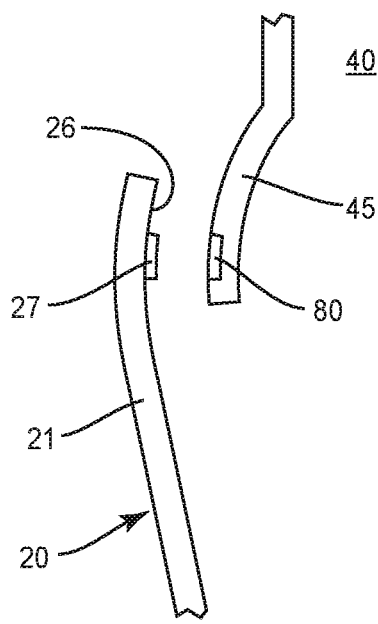
FIG. 23 is a schematic view of a sensor on an outer race to detect a position of a flight control member.

FIG. 23 includes a sensor 80 positioned to detect relative movement between the flight control member 20 and the base 30. Specifically, FIG. 23 includes a configuration with the sensor 80 on the outer race 45 of the joint 40. The outer race 45 is attached to the base 30 such that motion of the flight control member 20 results in relative motion with the outer race 45 that is detected by the sensor 80. In a similar configuration, a sensor 80 can be positioned on the flight control member 20 and detect the relative position of the outer race 45.

Figure 24:
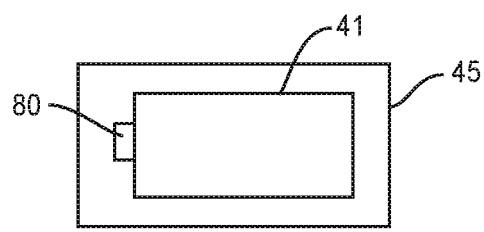
FIG. 24 is a schematic view of a sensor on an inner race to detect a position of an outer race.

Another configuration is illustrated in FIG. 24 that includes a sensor 80 positioned on the inner race 41 to sense a position of the outer race 45. The inner race 41 is attached to the flight control member 20 through the extension member 22 and is thus able to detect relative motion of the base 30 that is attached to the outer race 45. Similarly, another configuration can include the sensor 80 positioned on the outer race 45 to sense a position of the inner race 41.

Figure 25:
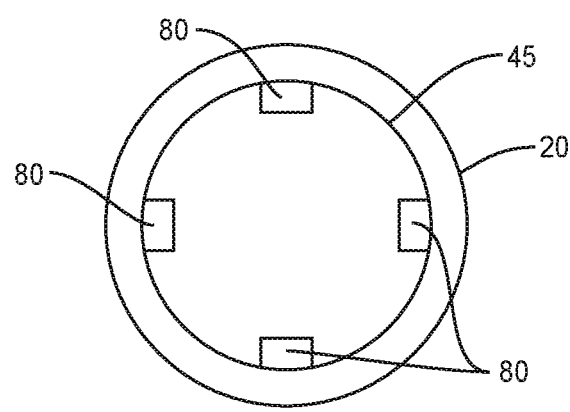
FIG. 25 is a top schematic view of multiple sensors positioned on an outer race of a joint to detect a flight control member.

Multiple sensors 80 can be positioned to sense the relative movement. FIG. 25 includes four sensors 80 spaced 90° apart around the perimeter of the outer race 45. Inputs from the different can be used to determine the movement, or one or more of the sensors 80 can provide for redundancy. The number and spacing of the position sensors 80 can vary. Further, different position sensors 80 can be placed on the different components and configured to sense the opposing surfaces (e.g., on the inner race 41 to sense the outer race 45 and on the flight control member 20 to sense the outer race 45).

The direction of the flight control member 20 relative to an off-platform target can be determined by a seeker sensor 85 (see FIG. 3) mounted within the interior of the flight control member 20. The seeker sensor 85 orientation changes relative to an off-platform target due to motion of the flight control member 20.

Figure 26:
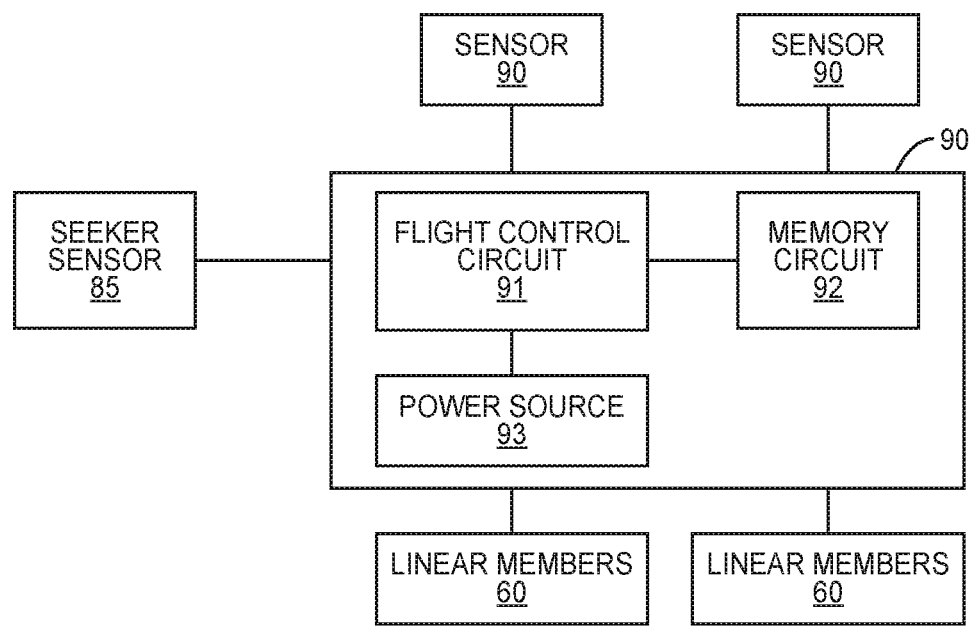
FIG. 26 is a schematic diagram of a flight controller

The aircraft 10 can include a flight controller 90 that controls the flight based on inputs from the position sensors 80 and the seeker sensor 85. The flight controller 90 can be located in the flight control member 20 or can be located in the base 30. As illustrated in FIG. 26, the flight controller 90 includes one or more processing circuits (shown as flight control circuit 91) that can include one or more microprocessors, Application Specific Integrated Circuits (ASICs), or the like, configured with appropriate software and/or firmware. A computer readable storage medium (shown as memory circuit 92) stores data and computer readable program code that configures the processing circuit 91 to implement the techniques described above. Memory circuit 92 is a non-transitory computer readable medium, and can include various memory devices such as random access memory, read-only memory, and flash memory. The flight controller 90 can also include a power source 93. The power source 93 can include one may be battery packs that include a set of battery cells configured to power electrical equipment.

The flight controller 90 receives signals from the seeker sensor 85 and derives parameters to put the base 30 on a particular flight vector. The flight controller 90 converts the parameters from the seeker sensor 85 to two or three position commands. The position commands are then used to actuate the linear members 60 as needed to adjust the extension member 22 and thus change the orientation of the flight control member 20 relative to the base 30 to follow the flight vector.

The flight controller 90 can receive inputs from the seeker sensor 85 and position sensors 80 at various frequencies. The flight controller 90 can continually determine position commands that are then acted upon by the linear members 60 to adjust the flight control member 20 as necessary.

Once the linear members 60 move, the sensors 80 work on two orthogonal axes. Off axis motion, while sensed by the sensor 80, may not correlate to the linear motion of the linear members 60 and therefore can be ignored when determining the positional information. In one design with two linear members 60, there could be as few as two sensors 80 positioned at 90° locations. In a design with three linear members 60 that are spaced at 120 degree angular positions, the sensor 80 at 90° locations can be transformed to more closely match the 120 degree angular position of the linear member 60. For designs with different numbers of linear members 60, the sensor 80 is used to close the actuator position loop given the transformation output as the position command. With the continual update of the two parameter input, the non-linear nature of the transformation will converge to linear once the angle error converges to zero under the action of closed loop control.

The position commands can be treated as a disturbance input to the closed loop control such that the response of the flight control member 20 is much faster than the response necessary to reorient the base 30 with the flight control member 20. As the base 30 steers towards the orientation of the flight control member 20, the flight control member 20 orientation moves off the commanded direction as sensed by the seeker sensor 85. This drift may generate fast corrections to flight control member 20 orientation commands. The alignment command may be continuously at zero and will be satisfied unless it drives flight direction which develops a correction from either the seeker sensor 85 or the position sensors 80.

Figure 27:
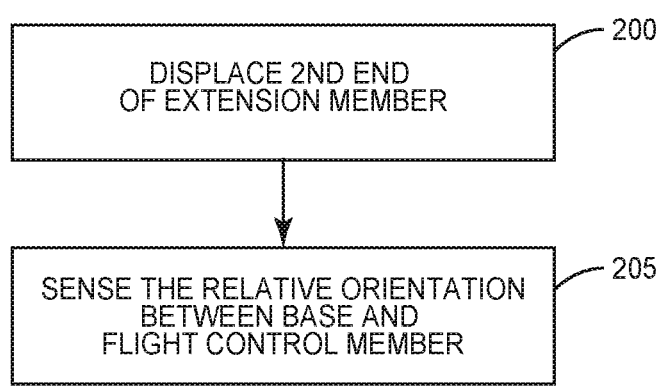
FIG. 27 is a flowchart diagram of a method of moving a flight control member of an aircraft.

FIG. 27 illustrates a method of changing an orientation of a flight control member 20 relative to a base 30. The method includes displacing the second end 24 of the extension member (block 200) 22 relative to the base 30 thereby changing an angular orientation of the flight control member 20 relative to the base 30 in two degrees of freedom while preventing rotation of the flight control member 20 relative to the base about an axis of the extension member 22. This displacement also changes a relative orientation of the inner race 41 of the joint 40 relative to the outer race 45. The method also includes sensing the relative orientation between the base 30 and the flight control member 20 (block 205).

The linear members 60 with integrated actuators 130 and inerters 140 can include various types of actuators, including but not limited to linear hydraulic actuators, rotary hydraulic actuators, an electro-hydraulic actuators (e.g., rotary or linear), mechanical actuators, electro-mechanical actuators, and other types of actuators.

Figure 28:
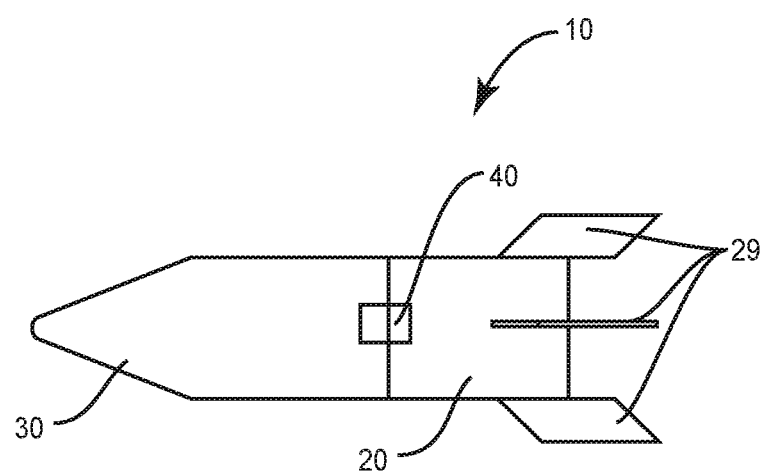
FIG. 28 is a schematic diagram of an aircraft.

The flight control member 20 can be positioned at a front of the aircraft 10 as illustrated in FIG. 2. The flight control member 20 can also be positioned on a rear of the aircraft 10. FIG. 28 includes an aircraft 10 that includes a flight control member 20 that includes a tail cone. The flight control member 20 is positioned on the rear of the base 30 and attached view a joint 40. One or more fins 29 can be positioned on the flight control member 20 to further assist in steering the base 30. The fins 29 can be fixed. The fins 29 develop additional surface area in motion to steer the base 30. In one design, the flight control member 20 includes a pair of surfaces at the top and bottom for yaw control and a pair of surfaces left and right for pitch control when the flight control member 20 is moved.

The actuator 60 with the integrated hydraulic actuator 130 and inerter 140 provides benefits that conventional actuator systems do not provide, or are not capable of providing. For example, the actuator 60 of the present aspects creates or contributes to a system that beneficially allows for significant savings in the power consumption of the aircraft 10 by increasing the damping of the actuator 60 which permits reduced actuator piston area and reduced flow proportional to the area reduction. Such reductions allow a hydraulic system that provides the hydraulic fluid at reduced flow rate. Additionally, because the actuator 60 of the present disclosure controls flutter, fewer hydraulic actuators 60 are needed on the aircraft 10 thereby requiring less power to be generated.

The devices and methods to position a flight control member 20 relative to a base 30 can be used with a variety of aircraft 10. One aircraft includes a commercial aircraft that includes rows of seats each configured to accommodate a passenger. Other aircraft 10 include but are not limited to manned aircraft, unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An assembly positioned on an aircraft to position a flight control member relative to a base to steer the aircraft, the assembly comprising:
   an extension member configured to be attached to the flight control member, the extension member comprising an elongated shape with first and second ends and having a longitudinal axis;

linear members that extend between and connect the second end of the extension member to the base, the linear members configured to change an angular orientation of the flight control member relative to the base by moving the second end of the extension member relative to the base; and a joint comprising an inner race mounted to the extension member, an outer race mounted to the base, and bearings between the inner and outer races, the joint configured to provide a spherical motion of the flight control member relative to the base achieving two orthogonal, rotational degrees of freedom and preventing rotation of the flight control member relative to the base about the longitudinal axis of the extension member.

2. The assembly of claim 1, wherein at least one of the linear members comprises a dampened actuator.

3. The assembly of claim 2, wherein the dampened actuator comprises:
a first terminal and a second terminal that are movable relative to one another along an axis and configured to be mutually exclusively coupled to the base and the second end of the extension member;
a rod coupled to and movable with the second terminal;
a threaded shaft coupled to and movable with the first terminal;
a flywheel having a flywheel annulus coupled to both the rod and the threaded shaft; and
the flywheel rotates in proportion to axial rate of the rod relative to the threaded shaft in correspondence with actuation of the flight control member by the actuator.

4. The assembly of claim 1, wherein at least one of the linear members comprises an inerter integrated within a hydraulic actuator, with the hydraulic actuator comprising a piston attached to a movable rod and with the piston dividing a housing chamber into a first chamber and a second chamber each configured to hold hydraulic fluid, and the inerter comprising a flywheel rotatably attached to the piston and positioned within one of the first and second chambers.

5. The assembly of claim 4, further comprising a motor that rotates the flywheel.

6. The assembly of claim 4, further comprising brakes that engage with the flywheel to control rotation of the flywheel relative to the piston.

7. The assembly of claim 1, wherein the flight control member is a nose cone and the base is a platform.

8. The assembly of claim 1, wherein the joint is a Rzeppa joint.

9. An aircraft comprising:
a flight control member;
a base;
an extension member affixed to the flight control member, the extension member comprising an elongated shape with first and second ends and having a longitudinal axis;
linear members that movably mount the second end of the extension member to the base, the linear members configured to change an angular orientation of the flight control member relative to the base by moving the second end of the extension member relative to the base;
a joint comprising an inner race mounted to the extension member, an outer race mounted to the base, and bearings, the joint configured to provide a spherical motion of the flight control member relative to the base achieving two orthogonal, rotational degrees of freedom and preventing rotation of the flight control member relative to the base about the longitudinal axis of the extension member;
sensors positioned at the joint to sense positions of the inner race relative to the outer race; and
a control circuit configured to receive signals from the sensors and to control a relative position between the flight control member and the base.

10. The aircraft of claim 9, wherein at least one of the linear members comprises and an actuator and an integrated inerter, the inerter comprising:
a first terminal and a second terminal that are movable relative to one another along an inerter axis and configured to be mutually exclusively coupled to the base and the extension member;
a rod coupled to and movable with the second terminal;
a threaded shaft coupled to and movable with the first terminal;
a flywheel having a flywheel annulus coupled to both the rod and the threaded shaft; and
the flywheel rotates in proportion to axial rate of the rod relative to the threaded shaft in correspondence with actuation of the flight control member by the actuator.

11. The aircraft of claim 9, wherein the flight control member is a nose cone.

12. The aircraft of claim 9, wherein the joint is a Rzeppa joint.

13. The aircraft of claim 9, wherein at least one of the linear members comprises an inerter integrated within a hydraulic actuator, with the hydraulic actuator comprising a piston attached to a movable rod and the piston positioning in a housing chamber and forming a first chamber and a second chamber that each hold hydraulic fluid.

14. A method of changing a relative orientation of a flight control member of an aircraft that is movably connected by a joint to a base of the aircraft, the flight control member being operatively connected to an inner race of the joint and the base being operatively connected to an outer race of the joint, the flight control member comprising an extension member and extending through the inner race and into the base, the base comprising linear members connected to the extension member, the method comprising:
displacing a second end of the extension member relative to the base thereby changing an angular orientation of the flight control member relative to the base in two degrees of freedom while preventing rotation of the flight control member relative to the base about an axis of the extension member, and changing an orientation of the inner race relative to the outer race; and
sensing the relative orientation between the inner race and the outer race.

15. The method of claim 14, further comprising using an actuator and displacing the second end of the extension member relative to the base comprising:
actuating the flight control member through movement of the extension member using the actuator;
axially accelerating, using an inerter coupled to the actuator, a first terminal relative to a second terminal of the inerter simultaneous with and in proportion to actuation of the extension member;
rotationally accelerating a flywheel of the inerter in proportion to and simultaneous with the axial acceleration of the first terminal relative to the second terminal; and
reducing actuator load oscillatory amplitude of the flight control member and the actuator in response to rotationally accelerating the flywheel.

16. The method of claim 15, wherein reducing actuator load oscillatory amplitude comprises reducing actuator load oscillatory amplitude at resonance of the flight control member.

17. The method of claim 15, wherein:
   the inerter is integrated into the actuator, the actuator is a hydraulic actuator having a piston coupled to an end of a rod and axially slidable within a housing; and
   the flywheel is rotatably coupled to one of the piston and the rod, the flywheel is threadably coupled to a threaded shaft.

18. The method of claim 15, further comprising actively controlling rotation of the flywheel in correspondence with actuation of the flight control member by the actuator.

19. The method of claim 18, wherein actively controlling rotation of the flywheel comprises dynamically braking, using at least one of a motor and a brake, the flywheel as the actuator is moving the extension member.

20. The method of claim 18, wherein actively controlling rotation of the flywheel comprises dynamically damping, using at least one of a motor and a brake, the flight control member as the actuator is moving the extension member.

* * * * *